United States Patent [19]
Alden

[11] 4,159,479
[45] Jun. 26, 1979

[54] ELECTROLYTIC GRAPHIC RECORDER WITH COVER RECEIVING RECORDING WEB

[75] Inventor: John M. Alden, Needham, Mass.

[73] Assignee: Alden Research Foundation, Westboro, Mass.

[21] Appl. No.: 931,405

[22] Filed: Aug. 8, 1978

Related U.S. Application Data

[63] Continuation of Ser. No. 751,649, Dec. 17, 1976.

[51] Int. Cl.² .................. G01P 15/06; G03G 17/02
[52] U.S. Cl. .................................. 346/165; 346/145
[58] Field of Search ............ 346/165, 101, 136, 145; 358/300

[56] References Cited

U.S. PATENT DOCUMENTS

| | | | |
|---|---|---|---|
| 3,166,752 | 1/1965 | Waterman | 346/165 |
| 3,546,707 | 12/1970 | Dixon | 346/165 |
| 3,875,577 | 4/1975 | Alden | 346/165 |
| 3,956,754 | 5/1976 | Mary et al. | 346/165 |
| 4,080,609 | 3/1978 | Garge | 346/165 |

*Primary Examiner*—Jay P. Lucas
*Attorney, Agent, or Firm*—James H. Grover

[57] ABSTRACT

An electrolytic facsimile recorder with a scanning helix cooperating with a blade electrode in a recording zone to mark a recording web drawn through the zone comprises a housing with a base and a cover. The base has a web support wall approaching the recording zone, and the cover has a compartment for receiving a roll of the moist, electrolytic web, the compartment overlying the web support wall on the base so to locate the moist web roll close to the recording zone.

4 Claims, 5 Drawing Figures

4,159,479

ELECTROLYTIC GRAPHIC RECORDER WITH COVER RECEIVING RECORDING WEB

This is a continuation of application Ser. No. 751,649, filed Dec. 17, 1976.

BACKGROUND OF THE INVENTION

In the facsimile art of recording electrical signals on a moist electrolytic web of paper or the like a typical facsimile recorder is constructed with a base having at one end a compartment for receiving a supply roll of moist electrolytic paper. In the base adjacent the paper compartment is a usually larger compartment or space in which is mounted a drum carrying on its periphery a helical electrode or helix. Beyond the helix are opposed feed rolls which grip the paper and draw it from the paper compartment through a recording zone above the helix where electrical signals applied to the helix and an opposed blade electrode on the other side of the paper pass a current through the paper causing a chemical reaction which marks the paper visibly. While the recorder described operates satisfactorily in many instances there is a tendency for the moist electrolytic paper to dry out during its travel from the paper compartment to the recording zone at the helix. The drying problem is particularly acute when recording and feed of the paper is intermittent or at very low rates. When the paper dries the electrolytic reaction diminishes and the quality of marking on the paper deteriorates.

Accordingly it is an object of the present invention to reconstruct the spacial arrangement of the paper location and the helix or other moving electrode so that the recording zone is so close to the paper supply roll that drying is greatly reduced or eliminated. A further object is to reduce the dimension of the recorder base in the plane of the recording zone. Frequently recorders are mounted on the panel of a larger instrument where surface area is limited. The present invention substantially reduces the area of the recorder parallel to the recording plane.

SUMMARY OF THE INVENTION

According to the present invention a graphic electric recorder for marking a moist recording web comprises a housing including a base and a cover hinged to the base, electrode means supported on the base for scanning along a recording zone, feed means for drawing recording web through the recording zone, the base having a web support surface extending toward the recording zone, wall means on the cover forming a compartment receiving a supply roll of recording web, the web compartment being located adjacent to the recording zone above said web support wall so that web leaving the supply roll immediately enters the recording zone.

DRAWING

DESCRIPTION

Figure 1:
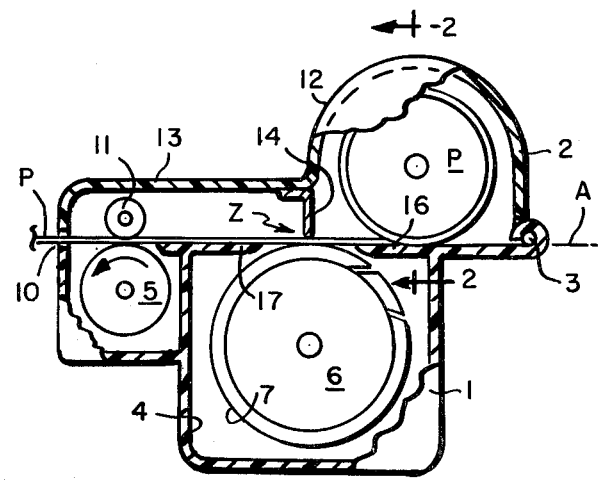
FIG. 1 is a side elevation of a facsimile recorder according to the invention, partially broken away.

As shown in FIG. 1 an electrolytic facsimile recorder comprises a housing including a base 1 and a cover 2 hinged to the base at 3. The base comprises a large compartment 4 enclosing a drum 6 journalled at each end and driven by a motor (not shown) in a well known manner, as shown, for instance, in U.S. Pat. No. 2,962,340 incorporated herein by reference. The drum 6 carries a helical electrode 7 curved around its periphery. Also journalled in the base adjacent the drum compartment 4 is a paper feed roll 5 driven by a second motor (not shown). The cover 2 comprises a compartment 12 for a supply roll of moist electrolytic paper P. The idler roll 11 and the feed roll 5 grip the paper and draw the paper from the paper compartment 12 over a support surface 16 and feeding it out of the housing through an exit 10 between the cover 2 and base 1. Secured to the cover 2 is a blade electrode 14 which extends parallel to the axis of the drum 6 and opposes the helical electrode 7 on the drum along a recording line or zone Z. According to the present invention the paper compartment 12 and the supply roll P contained therein are located on the upper side of a horizontal plane A passing through the zone Z and, in this case, through the path of paper feed to the feed roll 5. The helical scanning electrode 7 on the drum 6 is located on the lower side of the plane A. Further the paper compartment 12 substantially overlies the drum compartment 4 so that the paper roller P also substantially overlies the drum 6. Consequently the horizontal dimension of the recorder of FIG. 1 is shortened by approximately the sum of the two radii of the paper roll P and the drum 6. More significantly the opposed portions of the linear blade 14 and the helical electrode 7 at the recording zone Z are located at the exit from the paper compartment 12 in an extension 13 of the cover 2. That is, the blade 14 and recording zone Z are disposed on the circumference of the circular paper housing 12, as a consequence of which the paper leaving the roll P is as close as possible to the recording zone Z and the opportunity for the paper to dry after leaving the roll is minimized, particularly since the blade closes off the paper compartment from outside air and maintains a moist atmosphere in the paper compartment.

Figures 2, 3:
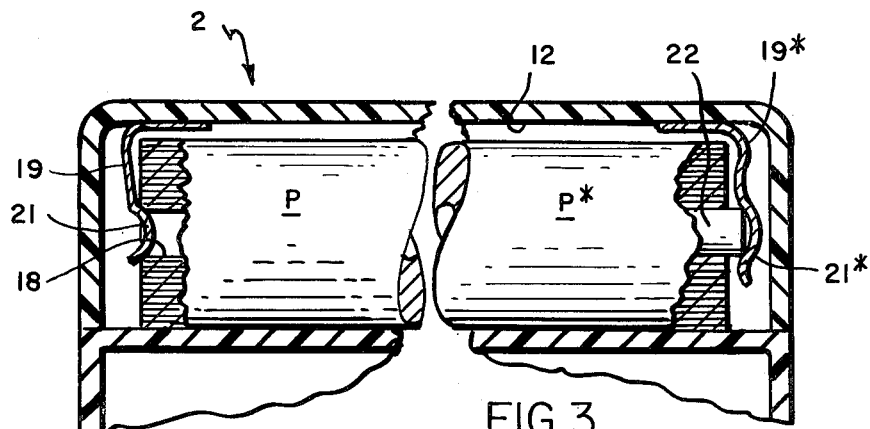
FIG. 2 is a section of line 2—2 of FIG. 1.
FIG. 3 is a view like FIG. 2 of an alternate embodiment.

As shown in FIGS. 2 and 3 the paper roll P may be positioned within the compartment 12 in one of two ways. If the paper roll is coreless and has an axial tubular hollow space 18, two spring clips 19 are secured to the top of the paper compartment 12 with a convex portion 21 snap engaging in the end of the hollow space 18. If, as shown in FIG. 3, the paper roll P* has a cylindrical core 22, a spring 19* is provided with a concave end 21 engaging over the end of the core 22. In the form of either FIG. 2 or FIG. 3 the paper compartment may be loaded by opening the cover 2 on its hinge 3 and snapping the roll between a pair of springs 19 or 19*.

Figure 4:
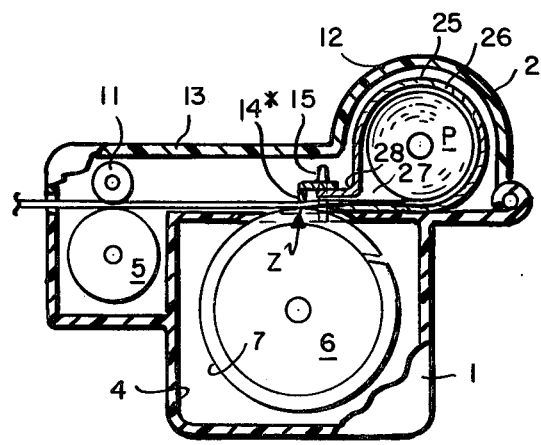
FIG. 4 is a view like FIG. 1 of a further alternative embodiment of facsimile recorder.
Figure 5:
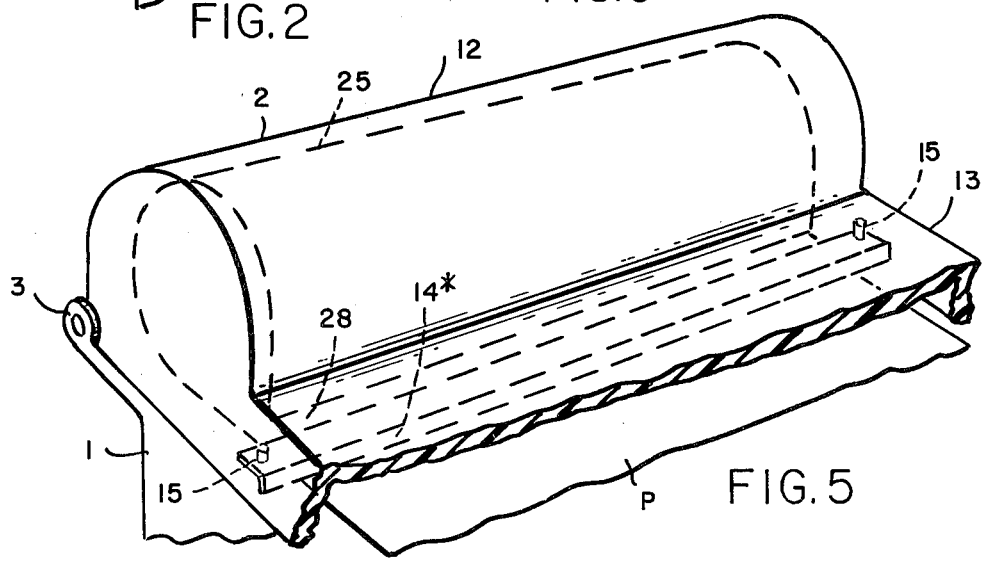
FIG. 5 is an isometric view of the modified paper compartment detail of FIG. 4.

A construction is shown in FIGS. 4 and 5 which is similar to that of FIGS. 1 and 3 except that the linear or blade electrode 14* is mounted on a cassette 25 containing the paper roll P and is positioned with respect to the base 1 by a pin 15. The cassette comprises a generally circular tubular wall 26 encircling the paper roll and end walls 27. A flat tubular extension 28 from the tubular walls provides a short exit covering around the paper path. The paper exit end of the extension 28 also provides a top surface for mounting the blade electrode 14* on the cassette. The blade is of L-shaped cross section one arm being adhered to the top surface of the extension and the other arm being bent downward across the paper exit from the exit for the extension. Electrical connection is made to the blade in any desired manner as shown schematically by a lead wire 29.

As with the recorder of FIGS. 1 and 3 the cassette recorder of FIGS. 4 and 5 locates the paper roll P above the paper path overlying the helix drum 6 and immediately adjacent the recording zone.

It should be understood that the present disclosure is for the purpose of illustration only and that this invention includes all modifications and equivalents which fall within the scope of the appended claims.

I claim:

1. A graphic electric recorder for marking a moist recording web comprising:
   a housing including a base and a cover hinged to the base and wall means on the cover forming a compartment for receiving and holding a supply roll of recording web;
   electrode means supported on the base for scanning along a recording zone;
   feed means for drawing recording web from the supply roll of recording web through the recording zone;
   web holding means for positioning the supply roll with the web leaving the roll on a linear path substantially direct from the web roll to the recording zone such that the web is drawn substantially on the shortest line between the web roll and the recording zone, said shortest line forming a plane and the web being drawn from the side of the roll nearest the scanning electrode; and
   said scanning electrode being located on one side of said plane and the axis of the web roll being located on the other side of said plane and opposite at least a portion of the scanning electrode with respect to the plane, so that a portion of the roll or recording web between the axis and the edge of the web roll overlies the scanning electrode with respect to said plane, whereby web leaving the supply roll immediately enters the recording zone.

2. A graphic electric recorder according to claim 1 wherein the recorder includes means for holding a roll of moist recording web, the web being drawn on a path through a plane to the scanning electrode and the web roll holding means substantially overlies the scanning means with respect to the web path plane.

3. A graphic electric recorder according to claim 2 wherein the scanning electrode comprises a conductor helically disposed on a drum.

4. A graphic electric recorder according to claim 1 wherein the scanning electrode comprises a conductor helically disposed on a drum.

* * * * *